Dec. 6, 1966 G. M. PAVEY, JR., ETAL 3,290,645

METHOD AND UNDERWATER STREAMER APPARATUS FOR IMPROVING THE FIDELITY OF RECORDED SEISMIC SIGNALS

Filed Feb. 13, 1964 11 Sheets-Sheet 1

INVENTORS
G. M. PAVEY, JR.
R. H. PEARSON

BY R. M. Hicks
ATTORNEY

METHOD AND UNDERWATER STREAMER APPARATUS FOR IMPROVING THE FIDELITY OF RECORDED SEISMIC SIGNALS

Filed Feb. 13, 1964 11 Sheets-Sheet 2

INVENTORS
G. M. PAVEY, JR.
R. H. PEARSON
BY R. M. Hicks
ATTORNEY

INVENTORS
G. M. PAVEY, JR.
R. H. PEARSON
BY
R. M. Hicks
ATTORNEY

INVENTORS
G. M. PAVEY, JR.
R. H. PEARSON
BY
R. M. Hicks
ATTORNEY

METHOD AND UNDERWATER STREAMER APPARATUS FOR IMPROVING THE FIDELITY OF RECORDED SEISMIC SIGNALS

Filed Feb. 13, 1964

INVENTORS
G. M. PAVEY, JR.
R. H. PEARSON

BY

R. M. Hicks
ATTORNEY

METHOD AND UNDERWATER STREAMER APPARATUS FOR IMPROVING THE FIDELITY OF RECORDED SEISMIC SIGNALS

Filed Feb. 13, 1964 11 Sheets-Sheet 6

INVENTORS
G. M. PAVEY, JR.
R. H PEARSON
BY
R. M. Hicks
ATTORNEY

Dec. 6, 1966 G. M. PAVEY, JR., ETAL 3,290,645

METHOD AND UNDERWATER STREAMER APPARATUS FOR IMPROVING THE FIDELITY OF RECORDED SEISMIC SIGNALS

Filed Feb. 13, 1964 11 Sheets-Sheet 7

BY

INVENTORS
G. M. PAVEY, JR.
R. H. PEARSON

R. M. Hicks
ATTORNEY

INVENTORS
G. M. PAVEY, JR.
R. H. PEARSON

BY

R. M. Hicks
ATTORNEY

INVENTORS
G. M. PAVEY, JR.
R. H. PEARSON

BY R. M. Hicks
ATTORNEY

INVENTORS
G. M. PAVEY, JR.
R. H. PEARSON

BY R. M. Hicks
ATTORNEY

INVENTORS
G. M. PAVEY, JR.
R. H. PEARSON

BY R. M. Hicks
ATTORNEY

United States Patent Office 3,290,645

Patented Dec. 6, 1966

3,290,645

METHOD AND UNDERWATER STREAMER APPARATUS FOR IMPROVING THE FIDELITY OF RECORDED SEISMIC SIGNALS

George M. Pavey, Jr., Dallas, and Raymond H. Pearson, Richardson, Tex., assignors, by mesne assignments, to Whitehall Electronics Corporation Filed Feb. 13, 1964, Ser. No. 344,670
16 Claims. (Cl. 340—7)

This invention relates to a method and waterborne apparatus for making a highly fidelity seismic survey of water covered areas and more particularly to a new and improved oil filled streamer immersed within the water for improving the character of the seismic signal reflected from subaqueous geological formations in response to an acoustical impulse within the water and picked up by a plurality of detecting devices disposed within the steamer while the steamer is towed by a vessel along a predetermined course, the improvement in the seismic signal resulting from the elimination of spurious signals reflected downwardly from the air-water interface and other random noise signals received by the detectors, regardless of the depth of submersion of the steamer.

It has been the usual practice, heretofore, in modern systems of this character such, for example, as the system for Method and Means for Surveying Geological Formations disclosed and claimed in Patent 2,465,696, issued March 29, 1949 to LeRoy C. Paslay, to receive seismic signals by a plurality of pressure responsive detectors disposed within a steamer and towed through the water by a vessel. While such a system has been generally satisfactory in service, it also receives secondary signals reflected from the surface of the water as the result of a mismatch of acoustical impedance at the air-water interface which may distort and otherwise adversely affect the seismic signals received by the detectors from the subsurface terrestrial structure from which the seismic signals are reflected. Since the pressure wave undergoes a 180 degree phase shift when reflected at the air-water interface nearly total cancellation of the seismic signal may result if the streamer is towed too near the surface. This condition has made it necesary heretofore for pressure detecting streamers to be operated at substantially a predetermined depth below the surface such, for example, as thirty feet for optimum results. This depth corresponds to one-quarter wave length of the seismic signal. Variations in the depth of the streamer from this predetermined depth, however, are accompanied by a deterioration of the recorded seismic signal caused by the effects of the secondary wave reflection from the surface of the water. In practice, it has been found that the streamer depth does not remain constant throughout the length thereof due to oil leaks in the streamer, temperature variations, speed fluctuations and other causes, particularly when, as is sometimes the case, the length of the streamer is in excess of 2700 feet from the head to the tail end.

An additional disadvantage resides in the fact that whenever the character of the signal changes from location to location corresponding to different shot points, the timing of the signal also changes. To measure time on the signal recording chart it is necessary that there be a consistent correlation of signals from location to location of the streamer as the explosive shots are fired in successive order. An accurate measure of these times and either assumed or known propagation velocities is essential to the preparation of an accurate map of the subbottom strata surveyed by the streamer. The downwardly reflected secondary signals have, in certain cases, seriously impaired the seismic signals detected by the pressure type detectors to such an extent that the seismologist has experienced considerable difficulty in recognizing and interpreting the recorded graphs of the seismic signals.

The system of the present invention possesses all of the advantages of the prior system employing pressure type detectors disposed within an elongated flexible oil filled streamer immersed within the water and none of the foregoing disadvantages.

In accordance with the teaching of the present invention the detection streamer is provided with a plurality of particle velocity sensing detectors or phones arranged within the streamer and interspersed with the pressure detector phones disposed therein, the electrical outputs of the velocity and pressure phones being connected in such a manner that the character of the seismic signal reflected from the subbottom strata and received by the pressure phones is not adversely affected by the reflected secondary wave from the air-water interface. The invention also contemplates a second group of velocity sensitive phones within the streamer electrically connected to the particle velocity responsive phones in a manner to cancel out unwanted signals due to motional disturbances generated by residual inertia effects.

An arrangement is thus provided in which the character of the recorded seismic wave corresponding to the signal reflected from the subbottom strata upwardly toward the submerged streamer is unaltered by the signal reflected downwardly toward the streamer from the air-water interface, and if desired, noise effects from unwanted motional causes are eliminated. The manner in which this desirable result is achieved will be more clearly apparent as the description proceeds.

One of the objects of the present invention is to provide an elongated flexible detection streamer adapted to be towed at various depths of submersion beneath the surface of a body of water and having means therein for producing a high fidelity output electrical signal correlative with the character of a seismic wave reflected from subbottom strata beneath the streamer and for excluding from the output electrical signal the adverse effects of a secondary wave reflected downwardly from the air-water interface and impinging on the streamer regardless of the depth of submersion of the streamer.

Another object is to provide a discriminating type of detection streamer for underwater surveying having means therein for rendering the streamer responsive to seismic waves approaching the streamer from below and substantially unresponsive to downwardly approaching waves reflected from the surface of the water at the air-water interface.

Still another object is the provision of a new and improved flexible oil filled streamer for a marine seismic system having a plurality of pressure responsive detectors and a plurality of particle velocity responsive devices therein so connected as to provide an electrical output signal correlative with the character of a seismic wave reflected from the subbottom strata and to be unresponsive to wave movement of the water caused by secondary reflections of the seismic wave from the surface of the water in a manner to prevent deterioration of the seismic signal as a result of the acoustical impulses caused by the waves reflected downwardly from the air-water interface and sensed by the pressure responsive detectors.

A further object resides in a new and improved oil filled detection streamer submersible at different depths within the water and having means for generating an electrical output seismic signal correlative with a seismic wave reflected by the subbottom strata beneath the streamer, and having new and improved particle velocity responsive means within the streamer for preventing deterioration of the seismic signal by reflections of the seismic wave from the surface of the water and additional means included within the streamer for canceling the inertia effects on the particle velocity means resulting from unwanted motional disturbance of the streamer.

A still further object of this invention is to provide a method and apparatus for canceling a secondary seismic wave reflected downwardly from the surface of the water by the use of the plurality of particle velocity detectors arranged within an oil filled streamer submerged within the water and interspersed with a plurality of pressure sensing detectors within the streamer and connected thereto in such manner that the output character of the pressure sensing detectors corresponds with a high degree of fidelity to the character of the primary seimsic wave reflected from the subbottom strata beneath the streamer unmutilated by secondary wave reflections and regardless of the depth of submersion of the streamer.

Still other objects, advantages and improvements will be apparent from the following description, taken in connection with the accompanying drawings of which:

Figure 1:
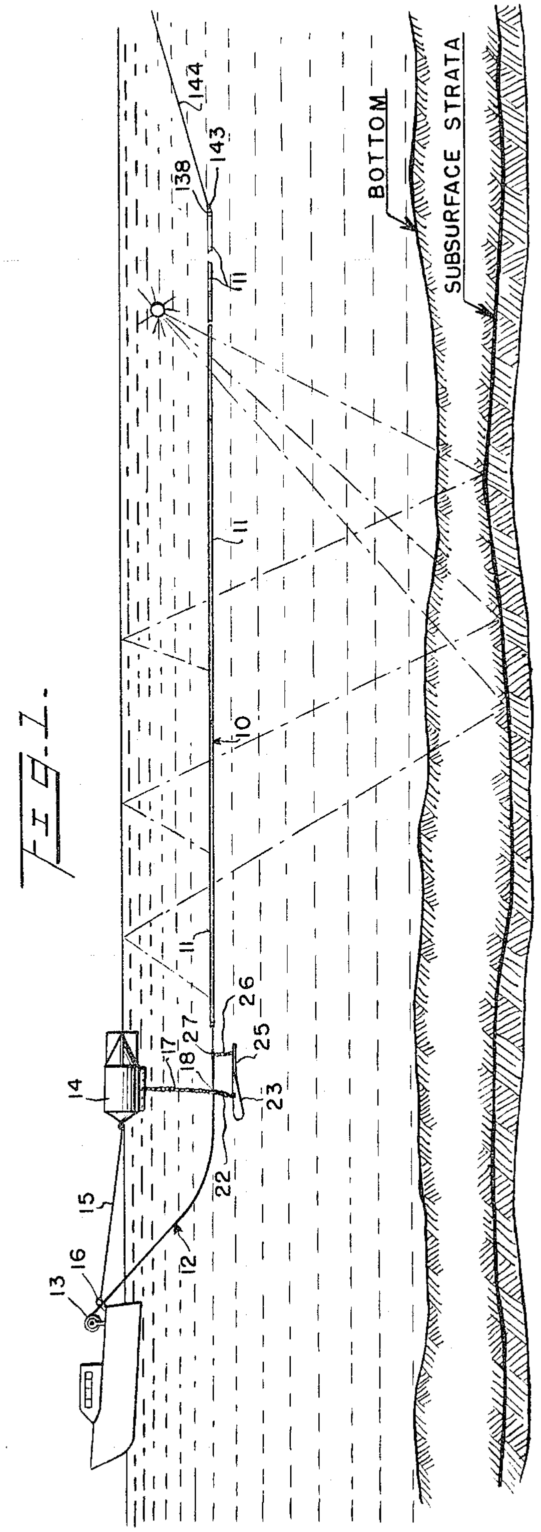
FIG. 1 is a diagrammatic view of the system of the present invention in accordance with a preferred embodiment thereof in which the detection streamer is being towed by a vessel and the particle velocity and pressure waves reflected from the subbottom and the air-water interface is shown in dashed outline.
Figure 2:
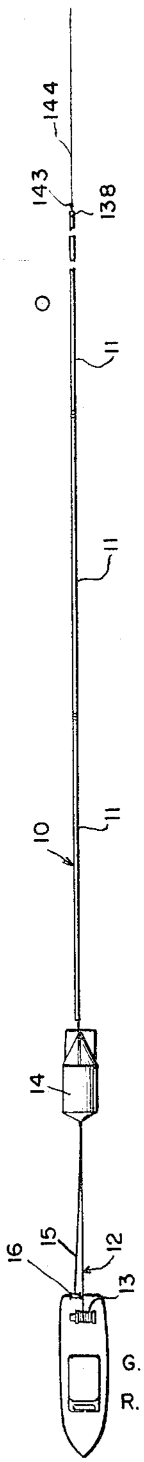
FIG. 2 is a plan view of the system of FIG. 1.
Figures 9, 10, 11, 12, 13, 14, 15:
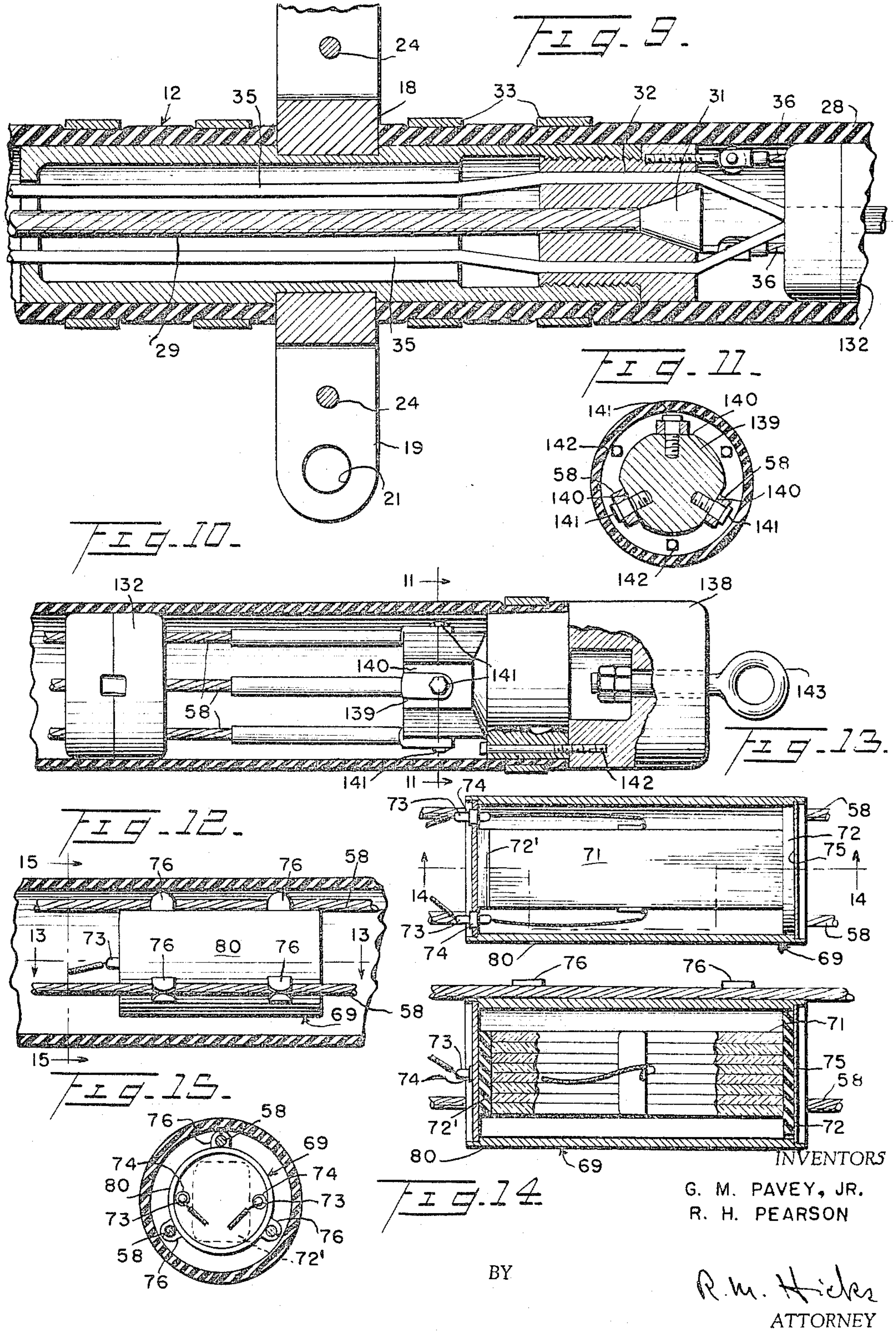
FIG. 9 is an enlarged detail view in section of the trailing end of the towing line illustrating the connections to the streamer, float and depressor.
FIG. 10 is an enlarged detail sectional view of the trailing end of the streamer.
FIG. 11 is a view taken substantially along the line 11—11 of FIG. 10.
FIG. 12 is a view partially in section of one of the pressure responsive devices mounted within the streamer.
FIG. 13 is an enlarged sectional view taken substantially along the line 13—13 of FIG. 12.
FIG. 14 is a view similar to FIG. 13 taken substantially along the line 14—14 of FIG. 13.
FIG. 15 is a view taken substantially along the line 15—15 of FIG. 12.
Figure 16:
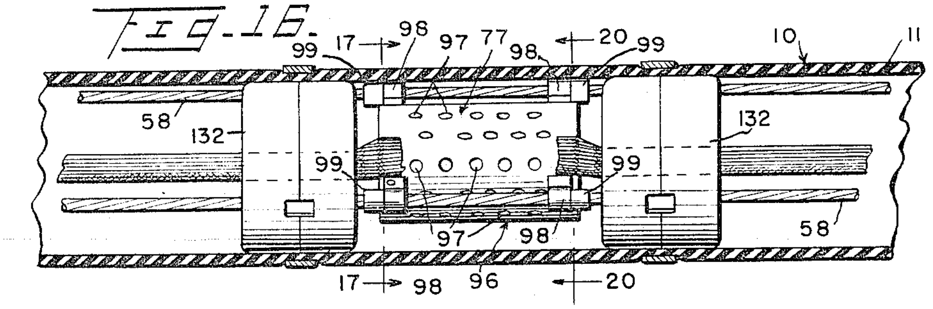
FIG. 16 is an enlarged view of one of the particle velocity detectors mounted within the streamer.

Referring now to the drawings on which like numerals of reference are employed to designate like parts throughout the several views and more particularly to FIG. 1 thereof, there is shown thereon in diagrammatic form a seismic surveying system employing the present invention in accordance with a preferred embodiment thereof, the system comprising a detector streamer generally indicated by the reference numeral 10 and composed of a plurality of oil filled sections 11 and towed by a vessel beneath the surface of the water. The streamer is provided with a lead-in or tow cable 12 payed out by a reel 13 for establishing a towing connection between the streamer and the vessel. There is also provided a float 14 towed by a length of line 15 secured at one end thereof to the vessel as at 16. A length of line such as the chain 17 connects the float to a collar 18 within which is disposed the trail-end end portion of the tow cable 12 as more clearly shown on FIG. 9. The collar is provided with a downwardly projecting member 19 having an aperture 21 therein for effecting a connection to bridle 22 to support a heavy depressor 23 within the water. The collar 18 is preferably of two piece construction to facilitate attachment to the tow cable 12, the parts being held together as by bolts, rivets or the like disposed within bores 24.

An arrangement is thus provided whereby the leading or head end of the streamer is towed at any predetermined depth controlled by the length of the chain 17. The depressor is provided with a trailing end portion 25 suspended by a line or length of chain 26 secured at one end thereof to a collar 27 encircling the tow cable 12. Each of the sections 11 comprises a length of flexible tubing composed of a plastic such as polyvinyl chloride and having the ends sealed as shown on FIGS. 4 and 5 to retain a quantity of oil therein.

Figure 3:
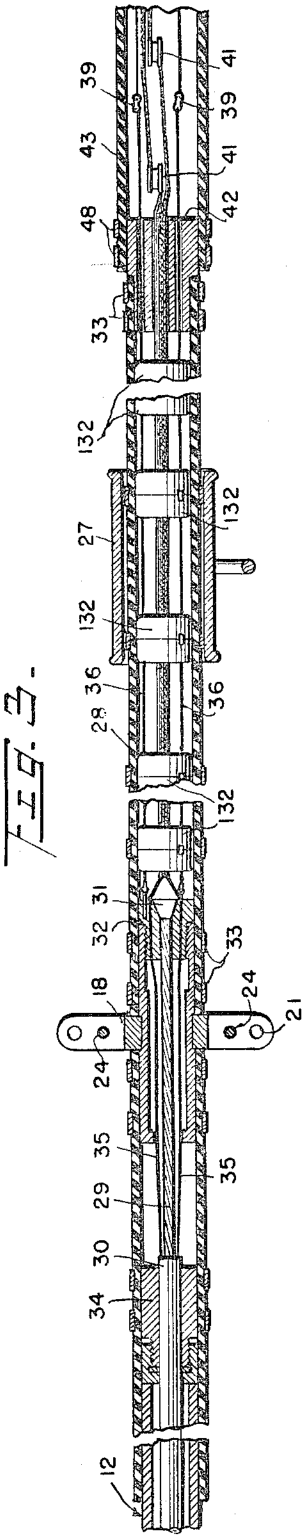
FIG. 3 is an enlarged sectional view partially in section of the tow cable and head end of the detection streamer of FIG. 1.

Referring now specifically to FIG. 3 the tow cable comprises a length of flexible tubing such as a gasoline hose 28 within which is disposed a strain cable 29 having the trailing end enlarged as at 31 for engagement with a complementary socket formed within a spider 32 composed of metal suitable for the purpose such, for example, as zinc to which the tubing 28 is tightly clamped by the clamps 33. A packing box 34 is tightly fitted within the hose as by the clamps illustrated to seal the strain cable 29 and a plurality of signal conductors 35 arranged adjacent thereto. A length of neoprene tubing 30 preferably encloses the signal conductors as a protective jacket.

Figures 34, 35, 36, 37, 38, 39, 40:
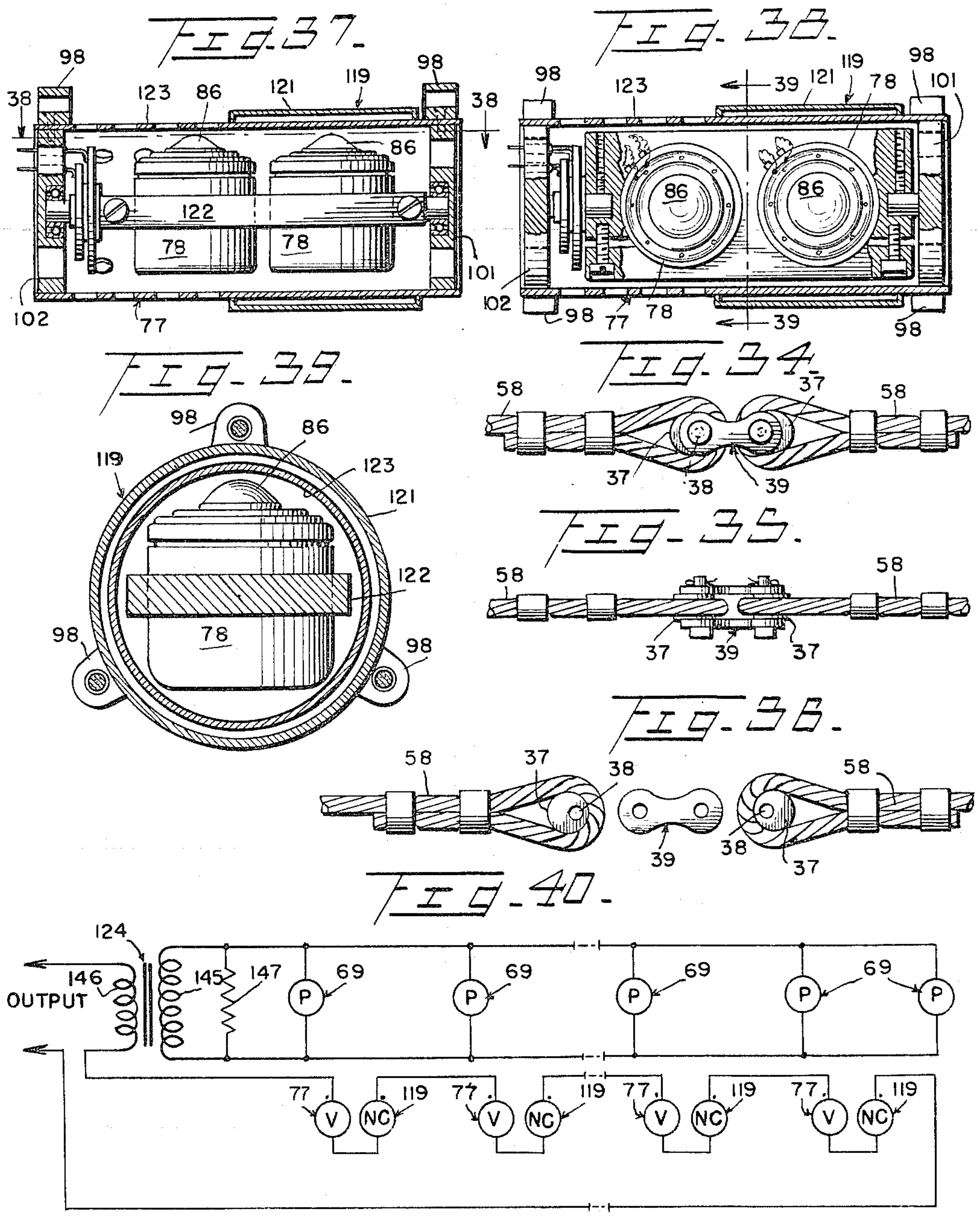
FIG. 34 is a detail view on which is shown the ends of two successive strain cables connected together.
FIG. 35 is a plan view of the devices of FIG. 34.
FIG. 36 is a view similar to FIG. 34 with the cables disconnected.
FIG. 37 is a view of the particle velocity and noise canceling detectors according to another embodiment thereof.
FIG. 38 is a sectional view taken substantially on the line 38—38 of FIG. 37.
FIG. 39 is an enlarged sectional view taken substantially on the line 39—39 of FIG. 38.
FIG. 40 is a circuit arrangement suitable for use with the present invention.

There is secured to the spider 32, as by the eye bolts illustrated, three equally spaced strain cables 36 of sufficient length to extend somewhat beyond the trailing end of the tow cable, each of the strain cables being formed in a looped portion snugly encircling a thimble 37 clamped therein as by the neoprene sleeves illustrated on FIG. 34. Each of the thimbles carries an eccentric eyelet 38 by means of which the effective length of the strain cables may be adjusted at will by rotation of the eyelet within the thimble before the eyelet is securely clamped therein. A clamping link generally indicated by the numeral 39 is employed in connection with the eccentric eyelets for establishing a towing connection from each strain cable to the next succeeding strain cable. The signal conductors within the tow cable also extend beyond the trailing end of the tow line and terminate preferably in two or more multi contact jacks 41 for establishing an electrical connection to the signal conductors of the streamer when the plugs associated therewith engage the jacks.

The trailing end of the tow cable is clamped to an apertured adaptor 42, the adaptor being also clamped to one end of a short length of hose 43 which is clamped at the other end thereof to the leading end of the flexible sleeve of the first or leading section 11 of the streamer for effecting a watertight connection therebetween. A plurality of spacing elements 132 are arranged at intervals along the tow line substantially as shown on FIG. 3 to maintain the strain cables and signal conductors in proper spaced relation. Since the lead-in or tow cable, per se, forms no part of the present invention, a further description thereof is deemed unnecessary.

Figure 4:
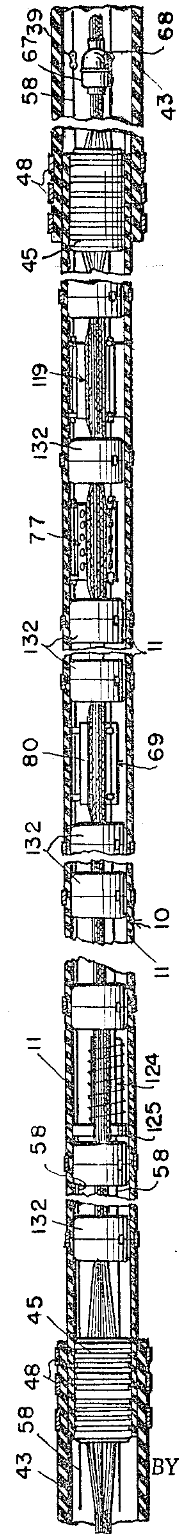
FIG. 4 is an enlarged sectional view and partially broken away of the head or leading section of the streamer of FIG. 1.

Referring now to FIG. 4 on which is shown a view somewhat in section and partially broken away of the head or leading detector section 11 of the streamer, the forward end thereof is fitted with a packing box 45. As more clearly shown on FIG. 29, this packing box is of generally cylindrical configuration and provided with a plurality of annular grooves 46 formed exteriorly therein for effecting an oiltight seal with the outer tubular member 47 of the streamer section when hose 43 is placed thereover and clamped by the clamps 48. The clamps 33 and 48 may be of any type suitable for the purpose such, for example, as a type known in the trade as a punch-lock clamp.

Figures 29, 30, 31:
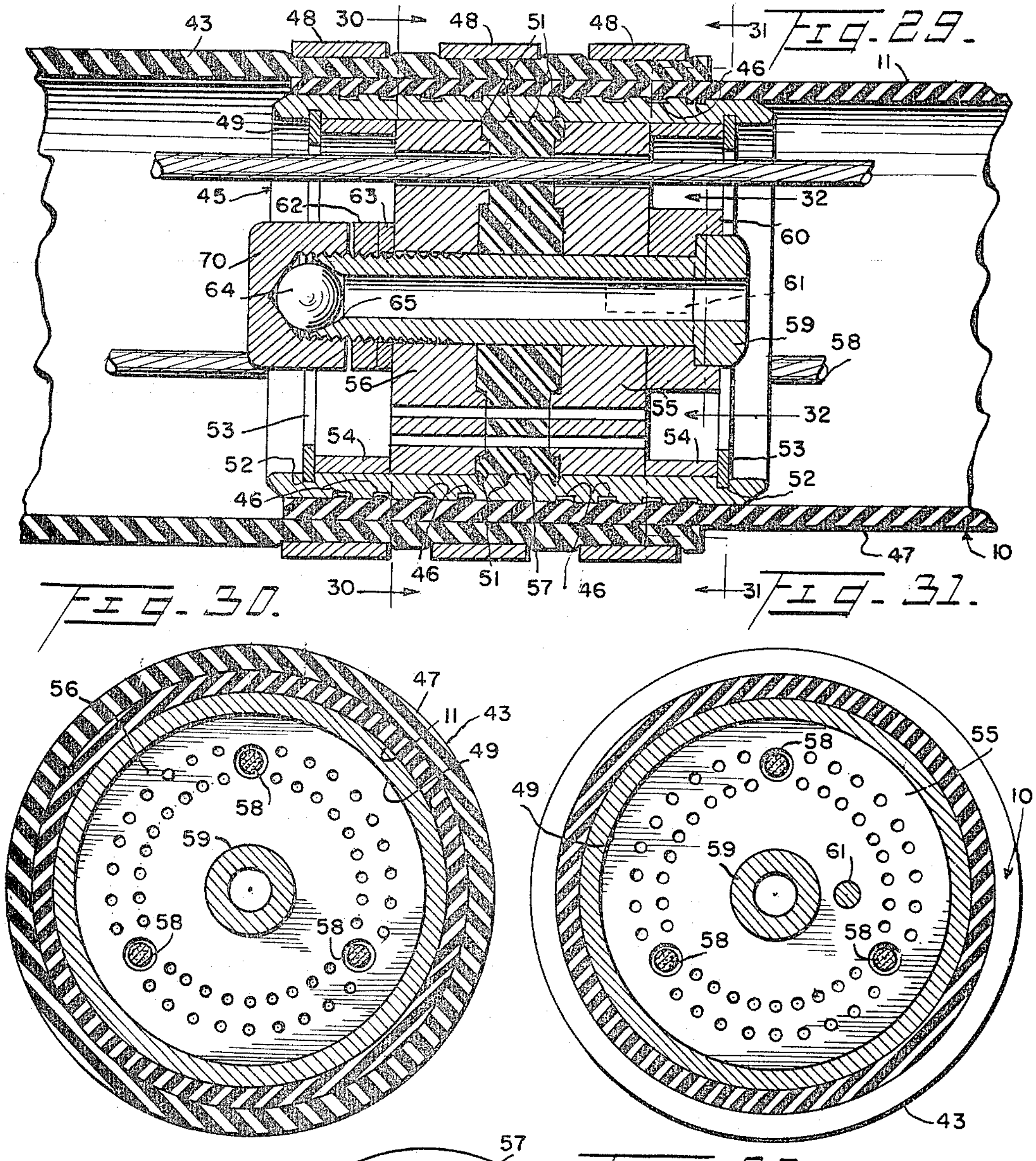
FIG. 29 is a greatly enlarged detail view of the end seal of a detector streamer and the means for filling the streamer with oil and thereafter sealing the oil within the streamer.
FIG. 30 is a sectional view taken substantially along the line 30—30 of FIG. 29.
FIG. 31 is a view taken substantially on the line 31—31 of FIG. 29.
Figures 32, 33:
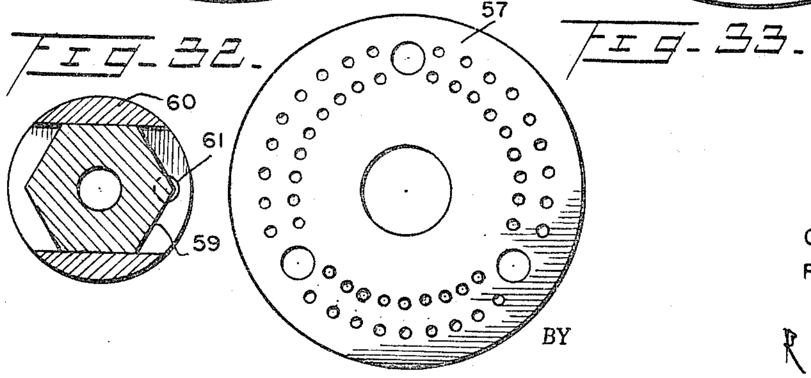
FIG. 32 is a sectional view taken substantially on the line 32—32 of FIG. 29.
FIG. 33 is a detail view of the oil sealing gaskets employed with the device of FIG. 29.

The packing box 45 comprises a tubular sleeve 49, FIG. 29, having a plurality of annular grooves 51 and a pair of annular recesses 52 formed therein. A pair of keeper rings 53 which may be of the spring lock type are set into the recesses 52. Abutting each of the keeper rings 53 is an aluminum spacer ring 54. A phenolic spacer element 55 abuts the rearmost ring 54 and a second phenolic spacer element 56 abuts the forward ring 54. A neoprene seal 57 is disposed between elements 55 and 56 and adapted to be compressed thereby sufficiently to force the seal 57 into sealing engagement with grooves 51 and to seal the signal conductors and strain cables 58 within the packing box. Each of the spacer elements 56 and 55 and the seal 57 is provided with suitable apertures through which the conductors and strain cables extend as shown on FIGS. 30, 31 and 33, respectively.

A tubular bolt 59 having a locking washer 60 configured to sieze the head thereof and doweled as at 61 to the spacer element 55 is assembled between the head of the bolt and the spacer element to prevent rotation of the bolt as nut 62 is tightened. A washer 63 is preferably assembled between nut 62 and the front spacer unit 56. Tightening nut 62 compresses neoprene seal 57 into fluid tight engagement with the bolt in addition to effecting a sealing connection with the strain cables and conductors.

Prior to use in service the streamer section is filled with oil by attaching an oil fitting to the hollow bolt 59. When the streamer is filled with oil a steel ball 64 is placed on a tapered seat 65 formed within the bolt. Cap nut 70 is now threaded on the bolt and tightened sufficiently to draw the ball into firm sealing engagement with the seat and thereby seal the oil within the streamer.

The opposite end of the streamer is provided with a similar packing box constructed and arranged to seal the trailing end of the streamer section and the signal wires and strain cables extending therethrough. It is inserted into the streamer section in back-to-back relation with respect to the packing box 45 in the forward end of the streamer such that the streamer may be filled with oil from either end or, if desired, it may employ a solid bolt to clamp the parts together in lieu of the hollow bolt 59 whereby the section streamer is invariably filled from the forward end. When this has been done, a thin oil tube having a flattened end portion is inserted beneath the short hose 43 at an end portion thereof and the hose 43 is filled with oil, after which the oil tube is withdrawn and the clamps 48 are tightened. The strain cables 58 extend somewhat beyond the trailing end of the streamer section 11 and are provided with thimbles and eyelets as shown in FIGS. 34–36 for connection to the strain cables of the next succeeding section. The forward ends of these strain cables, in like manner, extend beyond the leading end of the streamer section and are similarly terminated for connection to the strain cables 36 of the tow cable or the preceding streamer section, as the case may be.

The signal conductors 66 extend through the rear packing box and terminate in a jack 67 for connection with multicontact plug 68 to establish an electrical connection to the conductors of the next succeeding section. Since each section employs a signal output circuit of two conductors extending to the amplifier and recording apparatus on the vessel, it will be clearly apparent that the number of effective signal conductors extending rearwardly from each section will coincide with the number of effective signal conductors extending forwardly from the next succeeding section and each section will have, in addition to its own pair of signal conductors, the pairs of signal conductors of all the following sections extending forwardly therefrom.

Each of the detector streamer sections carries a plurality of piezoelectric microphonic devices arranged at intervals throughout the length thereof for detecting variations in pressure of the surrounding water caused by seismic signals received from a subaqueous reflecting surface. These piezoelectric devices may be similar to the detecting devices more fully disclosed in the Paslay Patent 2,465,696 for Method and Means for Surveying Geological Formations and responsive to variations in pressure of oil or similar fluid with which the detector streamer is filled.

Referring now to FIGS. 12–15 of the drawings the pressure responsive detectors indicated generally by the numeral 69 may each comprise a cup-like metallic casing 80 having a stack of piezoelectric crystals 71 therein. The crystals are connected at the end surfaces thereof to a pair of insulating elements 72 and 72$^1$ composed of material suitable for the purpose such, for example, as linen bakelite to which the crystals are cemented. The bottom or end wall of the casing is provided with a pair of terminals 73 insulated therefrom as at 74 and having a pair of flexible conductors connected thereto for establishing an electrical connection to the crystal stack. Element 72$^1$ is configured to avoid interference with terminals 73 and cemented to the bottom of the casing 80 for supporting the crystal stack therein. A thin flexible diaphragm 75 composed of metal such, for example, as phosphor bronze or the like is bonded as by solder in sealed relation at the periphery thereof to the lip of the cup. This diaphragm is in contact with insulating element 72 whereby variations in fluid pressure applied to the exterior surface of the diaphragm cause pressure impulses to be applied to the crystal stack which generates electrical signals correlative with the pressure variations received by the diaphragm 75.

The casing is provided with a plurality of outwardly projecting metallic lugs 76 bonded exteriorly thereto substantially as shown for connection to the strain cables 58, the connection being made secure as by soldering the parts together.

Whereas the detector streamer sections may be of any desired length, it will be assumed for the purpose of description that the detector streamer herein illustrated is about 100 feet long having twenty pressure responsive detecting devices 69 disposed therein at uniform intervals throughout the length of the streamer and that the pressure detector 69 illustrated is the third such detector from the head or leading end of the streamer section.

Figures 19, 20, 21:
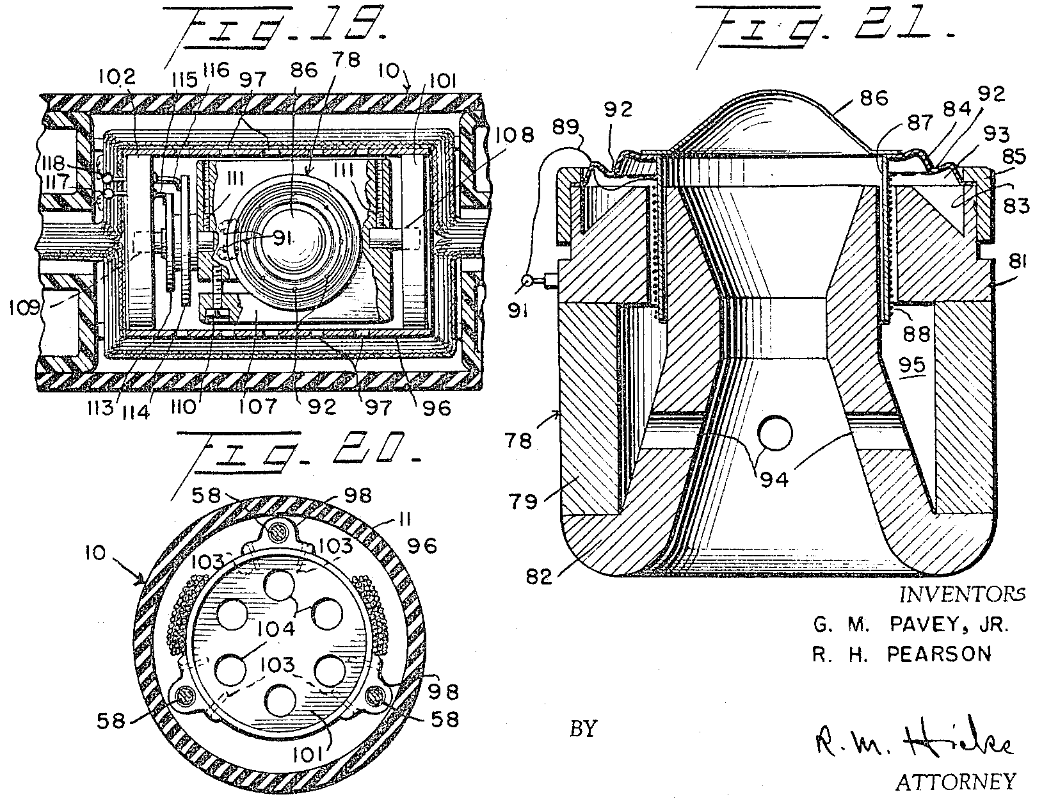
FIG. 19 is a view taken substantially along the line 19—19 of FIG. 18.
FIG. 20 is a view taken substantially along the line 20—20 of FIG. 16.
FIG. 21 is a sectional view greatly enlarged of the signal detecting and electrical generating mechanism employed with the particle velocity and motional responsive devices.
Figure 22:
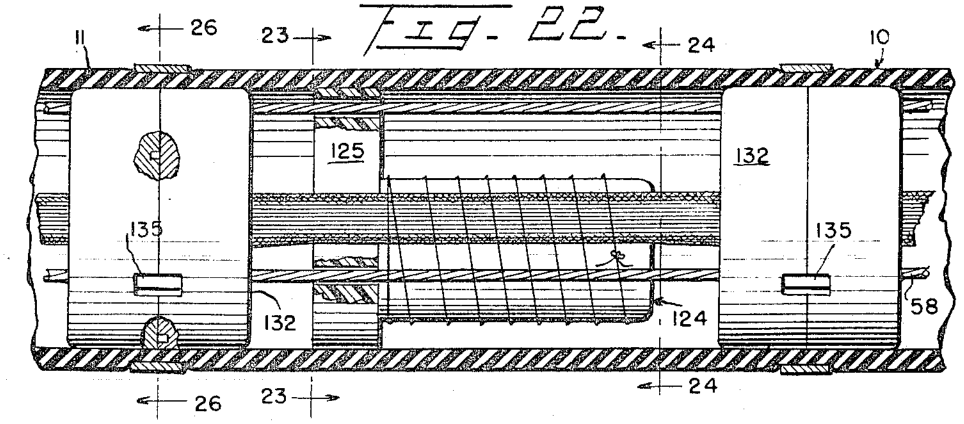
FIG. 22 is a view of the transformer preferably employed in the present invention and the structure for mounting the transformer between a pair of spacers.
Figures 23, 24:
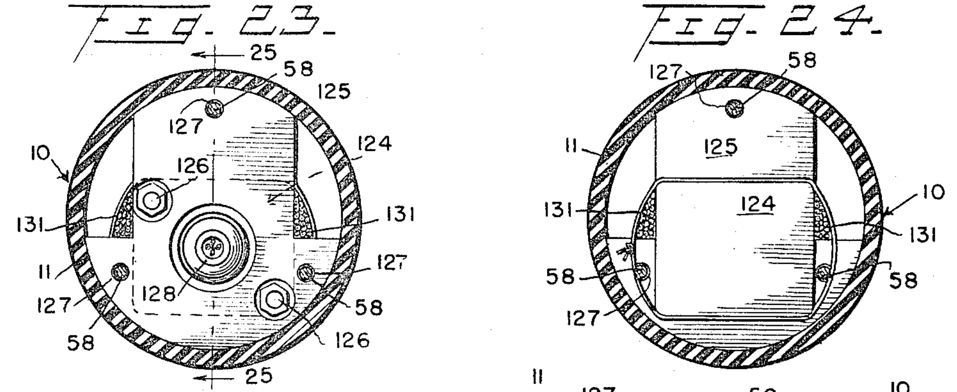
FIG. 23 is a sectional view taken substantially along the line 23—23 of FIG. 22.
FIG. 24 is a view similar to FIG. 23 and taken along the line 24—24 of FIG. 22.

The particle velocity detecting devices 77, herein called acoustically sensitive particle velocity phones, each includes a motion sensing unit indicated generally by the numeral 78, best shown on FIG. 21, the unit comprising a magnet assembly composed of an annular magnet 79 having a circular upper pole piece 81 and a hollow lower pole piece 82 configured substantially as shown and secured to the ends of the magnet in any suitable manner to provide a small annular air gap therebetween. The upper pole piece is provided with an annular upwardly projecting lip 83 to which is secured an annular flexible compliance member 84 in any suitable manner as by the clamping ring 85. Secured to the ring member 85 at the inner annular portion thereof is a thin rigid dome-like member 86 composed preferably of cloth and treated with a phenolic resin sufficiently to impart the desired degree of stiffness thereto.

There is also secured to the dome member along a peripheral portion thereof a cylindrical tube 87 composed preferably of paper of .003″ to .005″ in thickness treated with a stiffener and carrying a wire coil or winding 88 wrapped thereabout and cemented thereto.

The coil is connected by a pair of flexible conductors 89 to a pair of terminals 91 for establishing an exterior electrical connection to the coil. An arrangement is thus provided whereby the coil is adapted to be moved in each of two opposite directions vertically within the magnetic air gap in response to particle movement of the medium acting selectively on the exposed opposite sides of the diaphragm, this movement preferably being facilitated by a plurality of perforations 92 arranged annularly within the compliance member 84. The perforations 92 also serve an additional function of venting chamber 93 as the diaphragm is moved. The bottom pole piece 82 is provided with a relatively large aperture extending axially therethrough whereby the diaphragm has both surfaces directly exposed to acoustic waves and is responsive to waves approaching from either above or below and movable in each of two opposite directions by the waves selectively in accordance with the direction of movement thereof. A plurality of bores 94 are formed within the bottom pole piece transversely in communication with this large aperture to equalize the pressure within chamber 95 with the pressure of the medium within the aperture.

The structure for mounting the unit 78 and maintaining it in a vertical position comprises a tubular casing 96 perforated as at 97 and provided with a plurality of outstanding ears 98 having holes therein within which the strain cables 58 are disposed. The casing is prevented from axial movement along the strain cables by a plurality of sleeves 99 swaged or otherwise secured to the strain cables. The sleeve or casing 96 is fitted with a pair of end plates 101 and 102 respectively disposed within the end portions thereof and retained in position by a plurality of screws 103 which may also advantageously be employed to secure the ears 98 to the casing. Each of the plates 101–102 is provided with a plurality of apertures 104 to allow the oil to completely fill the casing 96, and a central bore 105 to receive and retain a bearing member 106 which, as illustrated, may be a ball bearing. The motion sensing unit 78 is fitted within a support 107 and clamped securely thereto by screw 110 as illustrated.

Figures 17, 18:
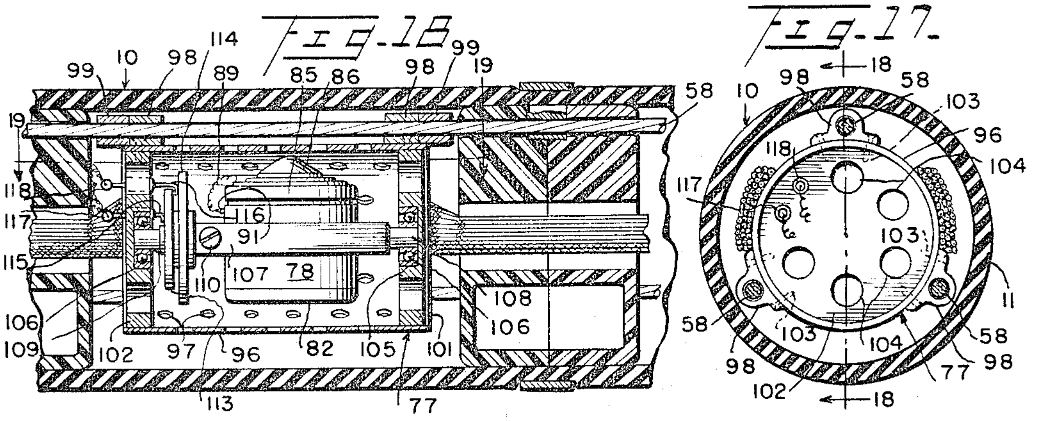
FIG. 17 is a view somewhat enlarged taken along the line 17—17 of FIG. 16.
FIG. 18 is a view partially in section taken substantially along the line 18—18 of FIG. 17.

A pair of bearing shafts 108 and 109 are fitted in mutually aligned relation within the support 107 and secured thereto as by the screws 111. The outer end of the shafts are fitted within the ball bearings 106. The support 107 is provided with an aperture within which the motion sensing unit 78 is arranged and securely clamped as by the screw 110 such that the center of gravity of the unit 78 lies below the axis of rotation of the support and the unit, therefore, is maintained in a substantially vertical position as viewed on FIG. 18 while the streamer section is being towed within the water.

Shaft 109 is somewhat longer than shaft 108 and carries for rotation therewith a pair of slip rings or discs 113 and 114 insulated therefrom and engaged by brushes 115 and 116 respectively connected to terminals 117 and 118. The slip discs 113–114 are connected electrically to terminals 91 by short lengths of conductor as is well known in the electrical art. An arrangement is thus provided for establishing an external electrical connection to the coil winding 88 regardless of rotative or oscillatory movement of the particle velocity detector about the axis of rotation thereof. The signal wires extending throughout the length of the detector streamer may be conveniently grouped about the particle velocity detectors 77 as indicated on FIG. 17.

In the assumed example of a streamer employing streamer detector sections having twenty pressure responsive detecting devices therein an arrangement employing four particle velocity detectors placed one each near the 3rd, 8th, 13th and 18th pressure detectors from the head end has been found satisfactory.

Preferably though not necessarily, there is also provided a plurality of acoustically insensitive motionally responsive phone units designated generally by the numeral 119 employing the same motion sensing unit 78 as the acoustically sensitive particle velocity responsive units 77 but differing therefrom in the construction of the outer tubular casing 96. Whereas, it will be recalled, the casing 96 of the acoustically sensitive unit 77 was provided with a plurality of perforations 97 for allowing free wave movement in either vertical direction of the liquid transmitting medium within which the device is immersed corresponding in both magnitude and character to the particle velocity of an acoustic wave sensed by the device 77, the outer tubular casing of the motionally responsive device 119 is not perforated but, on the other hand, it is provided with an outer cylindrical acoustic shield 121 extending throughout the length of the casing in such a manner as to form an air filled chamber therebetween effective to cause reflection of an acoustic wave and thus prevent the acoustic wave from actuating the dome shaped member 86 and coil 88 connected thereto. The general construction of this shield member is shown on FIGS. 37–38 of the drawings. Although the acoustic shield encloses a chamber filled with air, it is to be understood that, if desired, noise absorbing material suitable for the purpose may be employed, as is well known in the acoustic art, to insulate the motion sensing mechanism from acoustic waves impinging on the outer cylindrical surface of the shield. The device thus is responsive only to unwanted signals due to motional disturbances to the same degree as the acoustic particle velocity detector 77 to the exclusion of an acoustic wave. The motional responsive devices are equal in number to the acoustic detectors and mounted within the detector streamer such that each motional responsive device is in closely spaced adjacency to a different acoustic detector 77 and connected in series opposition thereto. This arrangement provides a cancellation of the electrical signals generated by the particle velocity detectors in response to motional disturbances resulting from residual inertia effects and thus electrical signals corresponding thereto are excluded from the seismic output signals received from the detector streamer by apparatus on the towing vessel. These motional responsive detector devices 119 are herein referred to, for the foregoing reasons, as noise cancelling detectors.

Referring now to FIG. 37 there is shown thereon an alternative arrangement in which the particle velocity detector and noise cancelling detectors are mounted side-by-side on a single support 122 pivoted for rotative or oscillatory movement as heretofore described in regard to the support block 107. The coils of the motion sensing units 78 are series connected in opposition to the slip discs and thence to the pair of output terminals by the brushes and conductors illustrated. The end plates 101 and 102 are fitted within the end portions of an elongated casing or sleeve 123 and secured thereto and to ears 98 by a plurality of screws whereby the device is supported by the strain cables 58. The casing is provided with a plurality of apertures extending circumferentially thereabout opposite the particle velocity detector and an outer acoustic shield 121 about the noise cancelling detector 119 which effectively prevents actuation of the dome member 86 of the noise cancelling detector by an acoustic wave.

Referring now to FIGS. 22–25, a transformer 124 is connected to a plastic mounting 125 by a pair of screws 126. The mounting is preferably configured substantially as shown and provided with three apertures 127 for receiving the strain cables 58 and an enlarged opening for the insertion of a multi-contact plug 128 which engages complementary slip connections formed in jack 129 secured to one end of the transformer. The transformer is positioned ahead of the pressure detectors near the forward or head end of the streamer section and lashed to the signal conductors adjacent thereto which are divided into two branches and extend along the transformer on opposite sides thereof as shown at 131, FIG. 23.

The transformer may be of any type suitable for the purpose such, for example, as a two winding transformer having a band pass frequency in excess of 45 cycles per second. Seismic reflected signals have been found to be within the frequency range of about 20 to 45 cycles per second and since the frequency of the reflected signals lies within the band pass frequency of the transformer no phase shift due to transformer action is encountered when the transformer is included in the output circuit of the detector streamer section.

The detector streamer section is also provided with a plurality of spacers or floats 132 arranged at intervals therein and connected to the strain cables 58 which pass through uniformly spaced apertures 133 formed in the floats. The floats are composed preferably of a material known in the trade as tyril plastic and are of generally cylindrical outer configuration snugly fitting within the streamer and provided with a central bore 134 within which the signal conductors are arranged, FIGS. 27–28. The float is composed of two parts bonded together along a transverse center line and provided with a cutaway portion 135 in communication with each of the apertures 133 for the introduction of a lump of molten solder of sufficient size to bond to the strain cables and prevent longitudinal movement of the float with respect thereto.

Figures 25, 26, 27, 28:
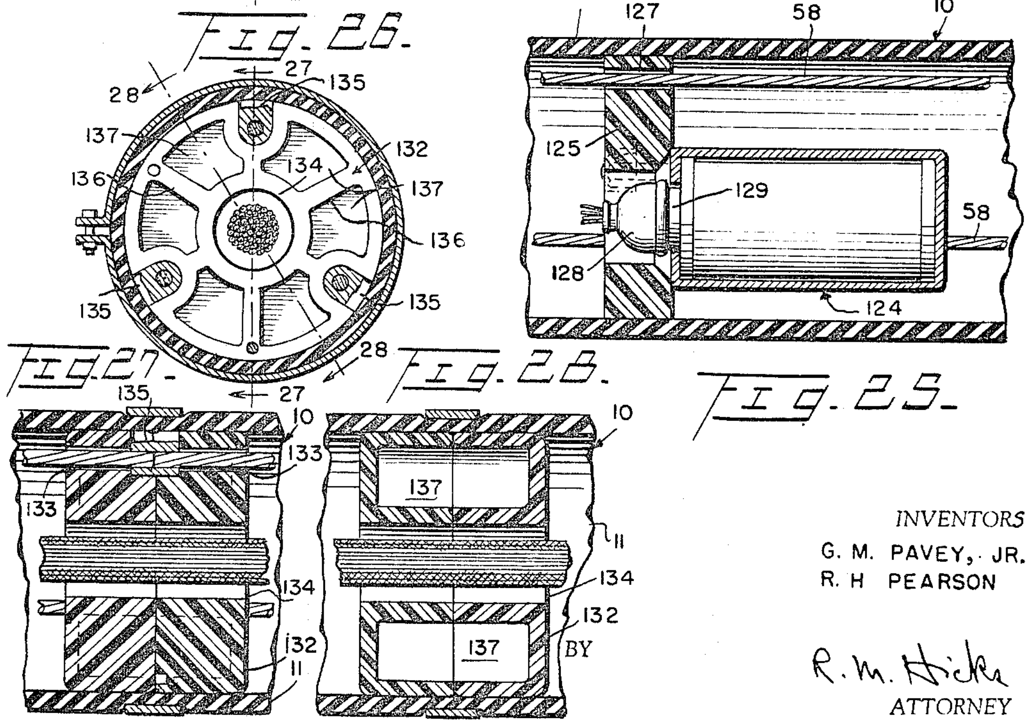
FIG. 25 is a sectional view taken substantially along the line 25—25 of FIG. 23.
FIG. 26 is a sectional view taken substantially along the line 26—26 of FIG. 22.
FIG. 27 is a view taken substantially along the line 27—27 of FIG. 26.
FIG. 28 is a view similar to FIG. 27 taken substantially along the line 28—28 of FIG. 26.

As most clearly shown on FIG. 26, each float is provided with a plurality of radial walls 136 communicating with a hollow hub in a manner to provide a plurality of sealed air chambers 137 and impart a relatively high degree of positive buoyancy thereto when the floats are immersed in oil. The floats are so arranged that a float is in closely spaced adjacency to both ends of each of the detectors within the streamer sections to avoid possible injury or damage to the detectors as the result of mechanical handling or winding upon a reel. A sufficient number of floats are employed to render the streamer substantially neutrally buoyant when submersed within the water. The term "neutrally buoyant," as employed herein, may be defined as a condition in which the weight of the fluid displaced by an object completely immersed therein is equal to the weight of the object.

Figure 5:
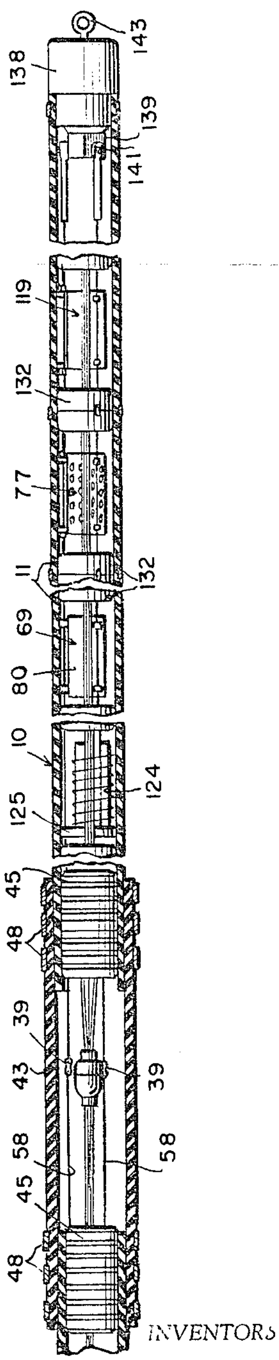
FIG. 5 is an enlarged sectional view of the trailing end of the streamer.
Figure 6:
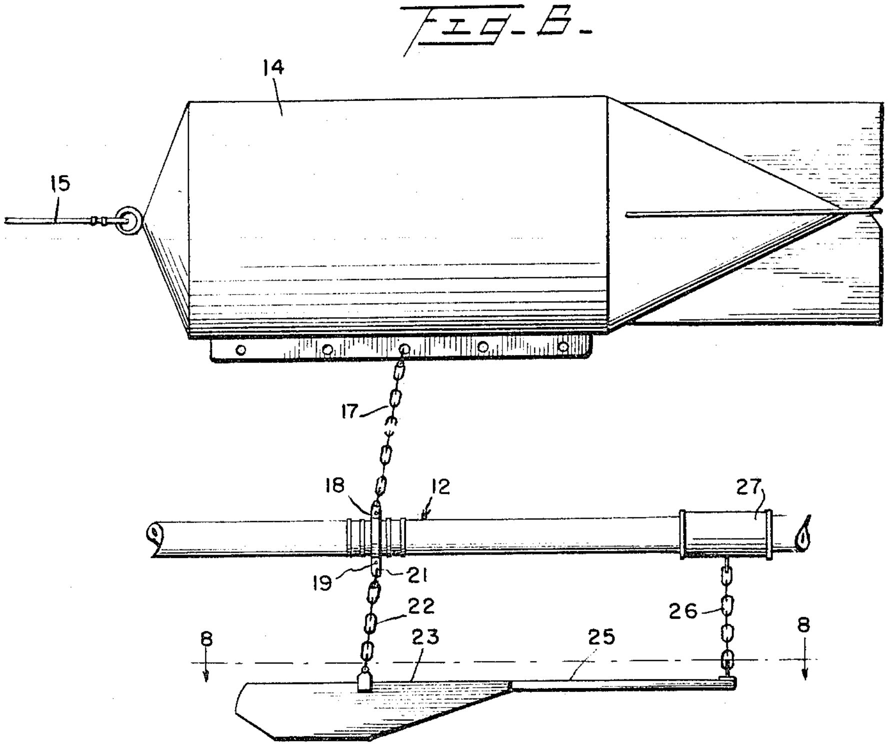
FIG. 6 is an enlarged elevational view of the float and depressor arrangement of FIG. 1.
Figure 7:
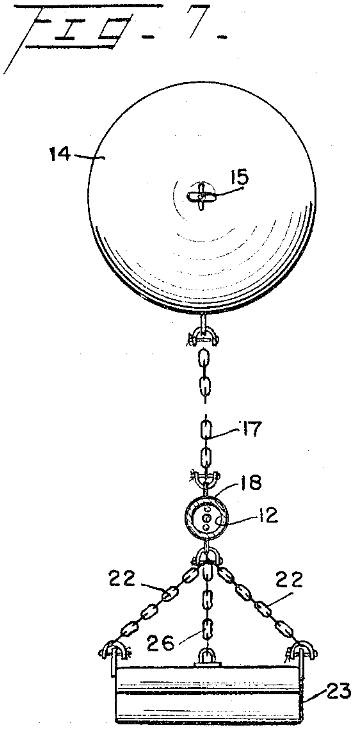
FIG. 7 is an end view of the device of FIG. 6.
Figure 8:
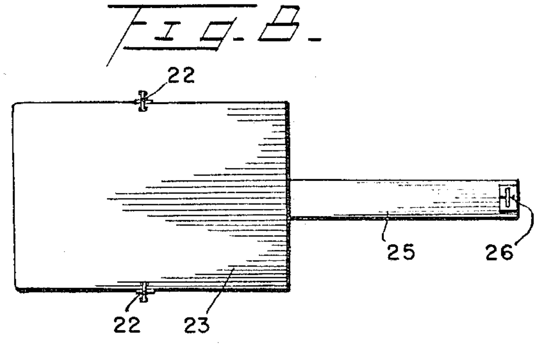
FIG. 8 is a view of the depressor taken along the line 8—8 of FIG. 6.

On FIG. 5 is shown the trailing end detector streamer section 11 which differs from the other streamer sections in the provision of plug member 138 clamped in the end portion of the section. As best shown on FIG. 10, the plug comprises an interiorly projecting member 139 having three equally spaced faces 140 to which the ends of the strain cables 58 are secured as by the screws 141. The member 139 is secured to plug member 138 as by screws 142. The plug 138 is recessed preferably as shown to receive a swivel connection terminating in an eye bolt 143 to which a marker buoy may be secured as by line 144 to provide a visual indication of the position of the trailing end of the streamer within the water.

On FIG. 40 is shown in schematic form a circuit arrangement suitable for use with the present invention, the circuit including a transformer 124 having a primary winding 145 and a secondary winding 146. The primary winding is connected to a resistance 147 and the pressure responsive detectors 69 within the streamer section 11, all in parallel, the resistance being employed to smooth out the signal. One end of the secondary winding is connected to one conductor of the output circuit of the streamer and the other end of the winding is connected to the pairs of particle velocity detectors 77 and noise canceling detectors 119, all in series, from whence the circuit continues to the other conductor of the output circuit. The velocity and noise cancelling detectors comprising a pair are connected together reversely, as shown on the circuit such that like signals generated by each of the detectors of the pair are cancelled. In certain cases in which the noise cancellation feature is unnecessary or not desired, the noise cancelling detectors may be omitted and the secondary winding of the transformer, therefore, would be connected in series with the particle velocity detectors only.

A discussion of the circuit arrangement shown on FIG. 40 is believed to be in order. The velocity and noise cancellation detectors have been shown connected in series with the secondary winding of the transformer for the reason that the voltage sensitivity of these serially-connected detectors is about the same as the output voltage at the secondary winding due to the pressure detectors connected to the primary winding. If the sensitivity and impedance of the particle velocity detector were increased sufficiently, they could be connected in series with the high impedance pressure detectors and satisfactory results would be obtained. Also the velocity detectors may be connected in parallel with either the primary or secondary windings of the transformer if they possess the proper sensitivity and impedance and the system would operate satisfactorily to obtain the desired result. The pressure detectors possess, in general, both a high impedance and a high voltage output whereas the impedance and voltage output of the particle velocity sensing detectors are both relatively low.

Figure 41:
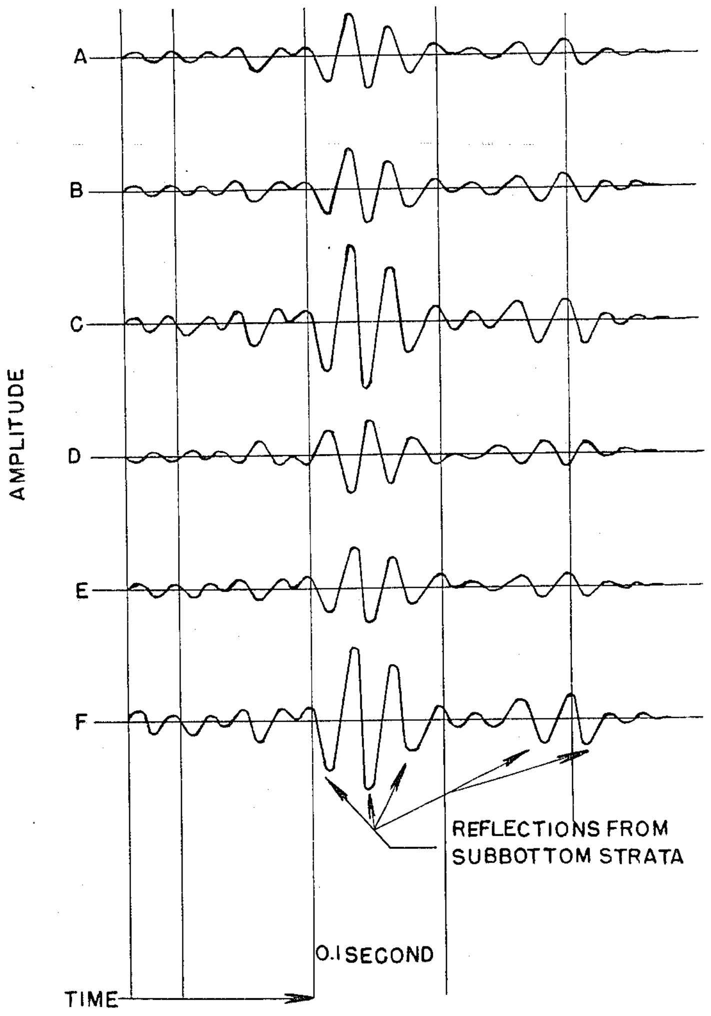
FIGS. 41, 42, and 43 are traces of pressure waves, particle velocity waves and waves due to random motional effects alone and in various combinations at depths just beneath the surface, 30 and 72 feet below the surface, respectively.
Figure 42:
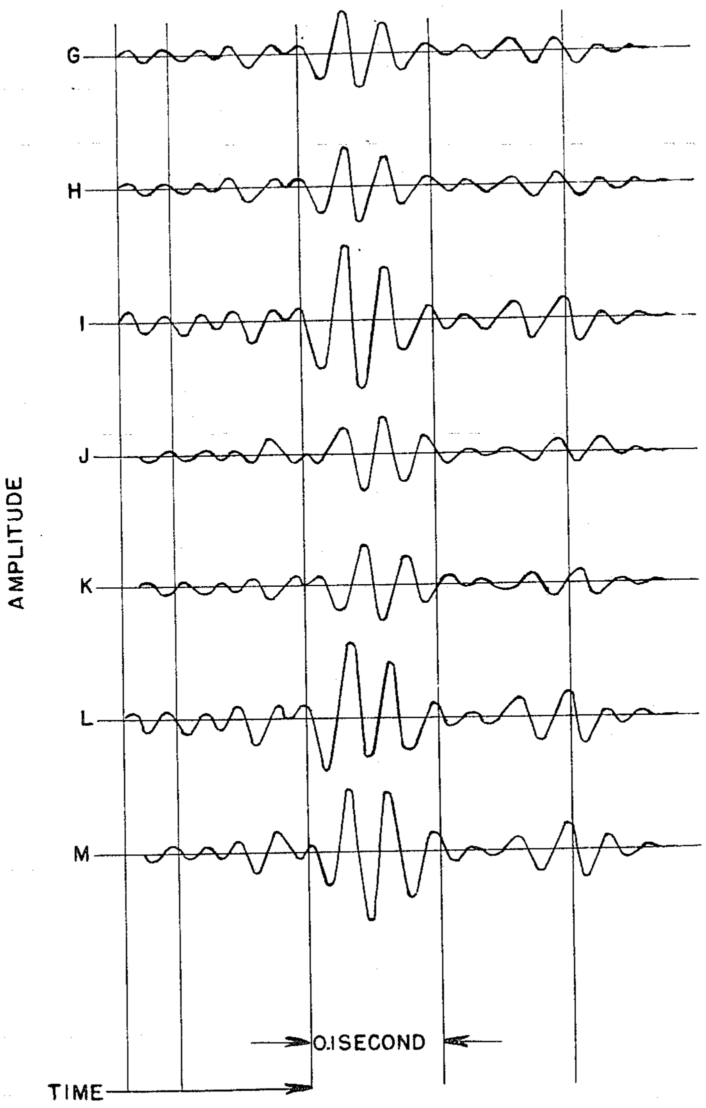
Figure 43:
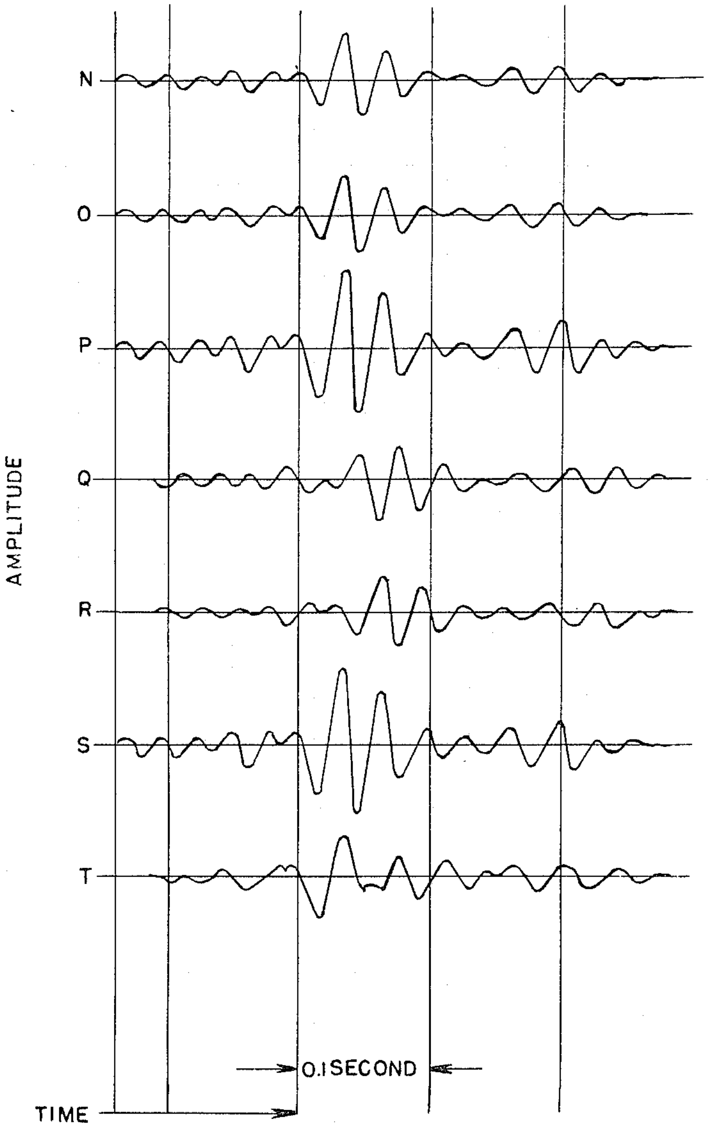

Before describing in detail the seismic tracings or graphs shown on FIGS. 41, 42 and 43, a brief general discussion of the nature and character of seismic waves reflected from a subbottom layer and from the air-water interface in the order named is deemed to be appropriate for a better understanding of the invention.

When an underwater seismic signal is reflected from a subbottom layer it travels upwardly until it reaches the surface of the water at which time it experiences a strong reflection from the air-water interface with a 180° phase shift. This reflected signal travels downwardly through the water and acts on the underwater detector in such a phase relationship to the original signal as to tend to cancel it out. In prior systems of this character employing pressure type phones or detectors only such, for example, as the system of Patent 2,465,696 to L. C. Paslay supra, optimum results are obtained when the detector system was placed about 30 feet below the surface of the water corresponding to one quarter wave length or more of the seismic signal. Since with long detector streamers which may, in some cases, reach a length of 1720 feet, it is extremely difficult to maintain this predetermined depth of submersion throughout the entire length of the streamer, the fidelity of the recorded seismic signal received from the subbottom layer may be seriously impaired as the result of deterioration by the secondary reflected wave from the air-water interface as the detector streamer departs from the original submerged depth of 30 feet, practically total cancellation resulting, for example, when the streamer has moved too close to the surface of the water.

If, now, the seismic signal received through the water be regarded as an acoustical wave, the amplitudes of both the pressure and particle velocity waves are in phase. The term "amplitude" is employed herein for the reason that pressure, as is well known, is a scalar quantity while velocity is a vector quantity. Furthermore, for the purpose of description, it may be assumed that the particle velocity is in phase with the pressure wave at that point along the wave when the pressure is maximum. Waves coming from below the detector streamer are reflections from the subbottom strata and are desired to be recorded with maximum fidelity whereas waves from above are secondary reflections from the air-water interface and are undesirable since they represent destructive interference with the waves from below.

Referring now more specifically to FIG. 41 on which is shown both pressure and velocity waves approaching the detector streamer through the water first upwardly and then downwardly when the streamer is near the surface of the water and the output signal when these waves are detected and combined in accordance with the teaching of the present invention. Let it be assumed, by way of example, that the streamer is only ten feet below the water surface and that trace or graph A is the output of the pressure detectors in response to a wave reflected from the subbottom and approaching the detector streamer from below. This is the graph possessing the character of the seismic signal which it is desired to record with high fidelity.

Graph B is the output of the velocity detectors corresponding to the wave reflected from the subbottom. Since, as previously stated, the pressure and particle velocity amplitudes are in phase and the detectors are, in the assumed example, properly phased and have identical sensitivities, graph B will be identical with graph A both in time and character. The composite output of waves A and B is shown as graph C which differs from graphs A and B in amplitude only.

Graph D is the signal output of the pressure detector in response to a wave reflected from the air-water interface and approaching the streamer downwardly. This reflected wave, it will be noted, is 180° out of phase with the signal A due to the wave from below by reason of the fact that the pressure wave undergoes a 180° phase shift when reflection occurs at the air-water interface. It is clearly apparent, therefore, that if the streamer contained pressure detectors only, the output at this depth of submersion would be negligible.

Graph E is a trace corresponding to the output of the velocity detectors due to the reflected wave from above. This signal is in phase with the signal from below received by the velocity detectors for the reason that the particle velocity, upon reflection from the interface, undergoes a phase shift of 180° with respect to the direction of propagation. Since the direction of propagation, however, is also reversed, the reflected particle velocity wave is in phase with the original wave.

If, now graphs A, B, D and E are added together, the composite graph or trace F results. This graph is identical in both character and time to the original graph A and is an important and distinct improvement over the graph obtained by the streamer employing pressure responsive devices alone when the streamer is operating just beneath the surface of the water for the reason that the character of the signal from below has not been altered by the signal from above. It is clearly apparent, from the foregoing, that the streamer of the present invention possesses a highly directional response characteristic.

On FIG. 42 is shown a series of graphs or traces generally similar to FIG. 41 and corresponding to a depth of submersion of the detector streamer of 30 feet. Graphs G and H are the outputs of the pressure and velocity detectors respectively in response to the upwardly approaching seismic wave of FIG. 41. The composite of graphs G and H is shown on graph I. The signal output, caused by the wave from above, is shown in graph J for the pressure detectors and in graph K for the velocity detectors, graphs J and K being delayed somewhat owing to the increased distance and time of travel of the wave from the detectors to the interface and back again. The composite of waves shown on graphs G, H, J and K is shown on graph L which is identical in both time and character to graph I. Again, in the present case, it has been clearly shown that the signal output of the detector streamer has not been altered by the secondary wave from above.

If, in this assumed case, the detector streamer contained pressure detectors only, the output would be graph M which is the composite of graphs G and J added together. Graph M, it will be noted, is not like graph G (the original signal from below) in either time or character.

On FIG. 43 is shown a sreies of graphs generally similar to FIG. 42 and corresponding to a depth of submersion of the detecting streamer of 72 feet. Graphs N and O represent the outputs of the pressure and velocity detectors respectively in response to the upwardly approaching seismic wave of FIG. 41. The composite of graphs N and O is shown on graph P. The wave from above causes outputs shown by graph Q for the pressure detectors and by graph R for the velocity detectors. The addition of graphs N, O, Q and R results in graph S which is identical in both time and character with graph P. Thus, once again the signal output has the same character as it would have had, if there had been no wave from above. If the detector streamer had employed pressure detectors only, the output therefrom would be as shown on graph T which is the summation of graphs N and Q. The character of graph T, it will be noted, is quite different from graph M employing pressure detectors only at a depth of 30 feet.

Whereas on FIG. 40 there is shown a circuit for combining the outputs of the pressure and velocity responsive detectors located within a streamer comprising a wave detecting station to effect a composite output therefrom possessing high fidelity to the original seismic wave reflected upwardly through the water from a subbottom layer and which is undistorted in either time or character by a secondary wave reflected downwardly through the water from the air-water interface, this result may also be achieved by other circuit arrangements or other instrumentalities or, if desired, the composite graphs could be plotted by hand from the separate graphs of the pressure and particle velocity detectors respectively.

Since the present invention is suitable for use with streamers employing a plurality of pressure sensing acoustic transducers as pickup units in a long, oil filled, neutrally buoyant hose for sensing underwater seismic signals regardless of the depth of submersion of the streamer within the water, it is also well adapted for use with the system disclosed and claimed in Patent 2,729,300 to L. C. Paslay et al. for Water Borne Means for Making Seismic Surveys in which the streamer is towed along the bed of the body of water in closely spaced adjacency thereto. In this system the depth of submersion of the streamer varies with the depth of the bottom as the streamer moves along during a towing operation. This system possesses an advantage over the system of the Paslay Patent 2,465,696 residing in the fact that the bottom towed streamer avoids lateral drift or side motion of the streamer due to water movement caused by surface tides or cross currents.

Whereas the invention has been described with particular reference to a preferred emobdiment thereof which gives satisfactory results, it will be understood by those skilled in the art to which the invention pertains, after understanding the invention, that various changes and modifications may be made and various instrumentalities may be employed without departing from the spirit and scope of the invention and it is our intention, therefore, in the appended claims to cover all such changes, modifications and instrumentalities.

What we claim as new and desire to secure by Letters Patent of the United States is:

1. In a waterborne seismic prospecting system for subaqueous geological structures, in combination, (1) an oil filled flexible elongated neutrally buoyant detector streamer adapted to be towed at various depths of submersion beneath the surface of a body of water, (2) a plurality of pressure responsive detectors disposed at intervals within the streamer throughout the length thereof for producing an output electrical signal correlative with the character of a seismic wave reflected from subbottom strata beneath the streamer, (3) and means within the streamer for erasing the electrical signal generated by the pressure responsive detectors and caused by a secondary seismic wave reflected downwardly from the surface of the water and impinging on the streamer at each of said depths of submersion of the streamer, (4) said signal erasing means comprising a plurality of particle velocity detectors, each having a yieldably supported thin rigid dome member having both surfaces thereof directly exposed to acoustic waves and movable selectively in each of two opposite directions at the particle velocity of an acoustic wave impinging on the surface directly exposed thereto, and (5) a voltage generating coil secured to and movable by said dome member within a magnetic air gap at the particle velocity of an acoustic wave impingon the surface of the dome member directly exposed thereto.

2. A detector streamer according to claim 1 in which said signal erasing means comprises (1) a signal output circuit, (2) and means connecting plurality of vertically mounted particle velocity detectors electrically connected in said output circuit in a manner to generate a voltage signal of equal and opposite polarity to the signal generated by the pressure responsive devices in response to the secondary wave acting on the streamer.

3. A detector streamer according to claim 2 including (1) a plurality of pivotal devices supporting said particle velocity detectors above the center of gravity thereof for free rotative movement of each of the particle velocity detectors about an axis disposed longitudinally within the streamer whereby the particle velocity detectors respond to substantially vertical particle movement of the surrounding medium at the same depth of submersion as the pressure responsive detectors.

4. A detector streamer according to claim 3 in which the particle velocity detectors are each provided with means for causing the detectors to respond to vertical particle velocity movement of the surrounding medium in either direction and generate an electrical output signal corresponding in polarity to the direction of movement of the medium.

5. In a seismic system for surveying subaqueous structures, in combination (1) a neutrally buoyant elongated flexible tubular detector streamer adapted to be towed by a vessel at different depths within the water and comprising, (2) a plurality of oil filled streamer sections in serial end-to-end connected relation, each of said sections having, (3) a plurality of strain cables disposed therein throughout the length thereof and connectable to the corresponding cables respectively of the next succeeding section for applying a towing connection to the cables of the next succeeding section, (4) a plurality of transformers arranged respectively within the head end of each section, (5) a plurality of pressure responsive transducers disposed interiorly at intervals within each of the sections and connected in parallel to the input winding of the transformer within the section for applying a seismic signal thereto correlative with the character of a pressure wave reflected from a geological structure disposed beneath the bed of a body of water and sensed by the transducers, (6) a plurality of pivotally supported velocity sensing phones arranged at intervals within the streamer intermediate said transducers, each of said phones comprising a flexibly mounted thin rigid dome member having both surfaces thereof directly exposed to acoustic waves and responsive to upward particle movement of the surrounding medium impinging directly on one of said surfaces resulting from a seismic wave reflected from a subaqueous structure and responsive reversely to downward particle movement of the medium as the secondary wave is reflected from the surface of the water impinging directly on the other of said surfaces, the velocity sensing phones being connected to the transformer in a manner to augment the electrical signal generated by the pressure responsive transducers corresponding to the seismic wave reflected upwardly from the subaqueous structure and to oppose and cancel the spurious electrical signal generated by the pressure transducers in response to the secondary wave reflected downwardly from the air-water interface at each of said depths of submersion, (7) and means forming a towing connection from the streamer to a moving vessel, said towing connection including a plurality of electrical conductors for establishing a plurality of output circuits connected between the transformers and signal amplifying and recording means on the vessel.

6. The combination according to claim 5 including (1) means on the ends of each strain cable for effecting a towing connection to the next succeeding section, (2) means for establishing a signal circuit to the output of the succeeding transformers, (3) and a flexible tightly clamped oil filled sleeve connecting the adjacent ends of each pair of detector streamers for excluding sea water from the end portions of the strain cables and signal circuits and for maintaining the buoyancy of the streamer substantially neutral throughout the length thereof.

7. The method of producing a high fidelity graph of a seismic wave within a body of water initiated by an acoustical impulse within the water and reflected from a subbottom layer which is correlative with the character of the layer and unaltered by a spurious secondary wave reflected by the air-water interface which comprises the steps of (1) firing an explosive shot within the water, (2) detecting the pressure wave reflected from the subbottom layer at a plurality of wave detecting stations disposed within the water at the same fixed depth greater than the depth at which the shot was fired and making a graph thereof,
(3) sensing the particle velocity of the water accompanying the pressure wave at the same depth the pressure wave was detected and making a graph thereof,
(4) detecting both the secondary pressure wave and the accompanying velocity wave at said depth caused by a secondary reflection of the seismic wave from the air-water interface and making two separate graphs respectively corresponding thereto,
(5) combining the first two named graphs to produce a high fidelity graph of the subbottom layer, and
(6) combining the secondary signals corresponding to said secondary pressure and particle velocity waves in a manner to cancel the graphic effect of the secondary signals on the high fidelity graph.

8. The method of making a high fidelity graph of a seismic wave corresponding to a seismic signal reflected upwardly from a subbottom layer toward a wave detecting station within the water, the character of which is unaffected by a secondary wave from the seismic signal reflected downwardly toward the station from the air-water interface which comprises the steps of
(1) detecting and recording a seismic signal comprising both pressure and particle velocity waves reflected upwardly from a terrestrial layer beneath a body of water below the wave detecting station and detected within the water at a predetermined fixed depth of submersion,
(2) detecting at said depth of submersion secondary pressure and particle velocity signals corresponding to waves reflected downwardly from the air-water interface above the wave detecting station, and
(3) combining the pressure and particle velocity waves at said depth of submersion in a manner to obtain an additive effect correlative with the character of the terrestrial layer from which the signals are reflected when the waves approach the wave detecting station upwardly and combining the secondary pressure and particle velocity signals in a manner to effect their mutual cancellation when the secondary pressure and velocity waves approach and impinge on the wave detecting station downwardly.

9. An elongated flexible oil filled streamer for use with a seismic prospecting system and adapted to be towed at different depths of submersion within the water by a moving vessel.
(1) a plurality of sensing devices arranged within the streamer and adapted to generate electrical signals in accordance with pressure impulses received while the streamer is moving through the surrounding water, said pressure impulses corresponding to seismic signals reflected from geological structures beneath the water and from the air-water interface respectively,
(2) an output circuit connected to said sensing devices,
(3) and acoustic means within the streamer for rendering the sensing devices ineffective at each of said depths of submersion to apply electrical signals to said output circuit corresponding to the seismic signals reflected from the air-water interface, said acoustic means comprising a particle velocity wave detector having a thin rigid dome member flexibly mounted thereon in such a manner as to have both surfaces thereof directly exposed to acoustic waves and movable thereby in either of two opposite directions at the particle velocity of the wave impinging on the surface directly exposed thereto.

10. A high fidelity system for prospecting for geological structures disposed beneath a body of water comprising
(1) an elongated flexible oil filled streamer towed by a vessel along the course thereof at different depths of submersion in the water and having a plurality of pressure responsive devices therein,
(2) each of said pressure responsive devices having means for generating electrical signals variably in accordance only with pressure impulses received while the streamer is moving through the surrounding water, said pressure impulses respectively corresponding to seismic signals reflected upwardly from geological structures beneath the water and thereafter reflected downwardly from the surface of the water at the air-water interface,
(3) and means within the streamer for cancelling the electrical signals generated by the signal generating means corresponding to the seismic signals reflected from the surface of the water whereby the electrical signals corresponding to pressure impulses reflected upwardly from the geological structures possess a high degree of fidelity at any of said depths of submersion of the streamer said signal cancelling means including a plurality of particle velocity detecting devices each having a thin rigid flexibly mounted dome member with both sides thereof directly exposed to acoustic waves and carrying a coil movable in either direction within a magnetic air gap at the particle velocity of the acoustic wave impinging on the exposed surface of the dome member.

11. In a waterborne seismic prospecting system for subaqueous geological structures, in combination,
(1) an oil filled flexible elongated neutrally buoyant detector streamer adapted to be towed at various depths of submersion beneath the surface of a body of water,
(2) a plurality of pressure responsive detectors disposed at intervals within the streamer throughout the length thereof for producing an output electrical signal correlative with the character of a seismic wave reflected from the subbottom strata beneath the streamer,
(3) means within the streamer for erasing the electrical signal generated by the pressure responsive detectors and caused by a secondary seismic wave reflected downwardly from the surface of the water and impinging on the streamer at each of said depths of submersion of the streamer and in which said signal erasing means comprises
(4) a signal output circuit having a plurality of vertically mounted particle velocity detectors serially connected therein in a manner to generate a voltage signal of equal and opposite polarity to the signal generated by the pressure responsive devices in response to the secondary wave acting on the streamer,
(5) a plurality of pivotal devices supporting said particle velocity detectors above the center of gravity thereof for free rotative movement of each of the particle velocity detectors about an axis disposed longitudinally within the streamer whereby the particle velocity detectors respond to substantially vertical particle movement of the surrounding medium and each of the particle velocity detectors is provided with
(6) means for causing the detectors to respond to vertical particle velocity movement of the surrounding medium in either direction and generate an electrical output signal corresponding in polarity to the direction of movement of the medium and the streamer is tubular in outer configuration and includes
(7) an additional plurality of noise cancelling devices arranged therein and interspersed with said pressure and particle velocity detectors, said noise cancelling devices having voltage generating means connected electrically to the particle velocity detectors in such manner as to cancel out unwanted signals produced by the particle velocity detectors as the result of motional disturbances generated by residual inertia effects exclusive of an acoustic wave.

12. A detection streamer according to claim 11 in which said noise cancelling devices comprise (1) a plurality of acoustically shielded transducers serially connected to said particle velocity detectors in a manner to cancel the output of the particle velocity detectors due to inertial effects caused by random movement of the streamer exclusive of an acoustic wave impinging thereon.

13. An elongated flexible oil filled streamer for use with a seismic prospecting system and adapted to be towed at different depths of submersion within the water by a moving vessel, (1) a plurality of sensing devices arranged within the streamer and adapted to generate electrical signals in accordance with pressure impulses received while the streamer is moving through the surrounding water, said pressure impulses corresponding to seismic signals reflected from geological structures beneath the water and from the air-water interface respectively, (2) an output circuit connected to said sensing devices, (3) acoustic means within the streamer for rendering the sensing devices ineffective at each of said depths of submersion to apply electrical signals to said output circuit corresponding to the seismic signals reflected from the air-water interface, and in which the acoustic means comprises, (4) a plurality of series connected particle velocity detectors maintained in a vertical position within the streamer and connected to the sensing devices in a manner to oppose the signals generated by the sensing devices only when the seismic signals impinge downwardly on the streamer from above, the number of particle velocity detectors being just sufficient to generate electrical signals of equal magnitude to and in predetermined phase relation with the electrical signals generated by the pressure sensing devices, and (5) a plurality of vertically disposed noise cancelling devices within the streamer and adapted to generate electrical signals in response to motional disturbances within the streamer to the exclusion of seismic signals received by the streamer, said noise cancelling devices being equal in number to the particle velocity detectors and opposedly connected thereto whereby noise signals generated by the particle velocity detectors as the result of motional disturbances of the streamer are effectively cancelled.

14. An elongated flexible oil filled streamer for use with a seismic prospecting system and adapted to be towed at different depths of submersion within the water by moving vessel, (1) a plurality of sensing devices arranged within the streamer and adapted to generate electrical signals in accordance with pressure impulses received while the streamer is moving through the surrounding water, said pressure impulses corresponding to seismic signals reflected from geological structures beneath the water and from the air-water interface respectively, (2) an output circuit connected to said sensing devices, (3) acoustic means within the streamer for rendering the sensing devices ineffective at each of said depths of submersion to apply electrical signals to said output circuit corresponding to the seismic signals reflected from the air-water interface, said acoustic means comprising (4) a particle velocity wave detector having a thin rigid dome member flexibly mounted thereon in such manner as to have both surfaces thereof directly exposed to acoustic waves and movable thereby in either of two opposite directions at the particle velocity of the wave impinging on the surface directly exposed thereto.

15. In a seismic system for surveying subaqueous structures, in combination (1) an acoustic particle velocity detector disposed within an elongated neutrally buoyant oil filled flexible streamer having a plurality of strain cables therein and adapted to be towed beneath the surface of the water for making underwater surveys of subaqueous geological structures, said detector comprising (2) an unsprung structure of high mechanical impedance and (3) means in said structure including an annular permanent magnet forming an annular magnetic air gap and having a circular aperture formed axially therein of sufficient size to prevent substantial impedance to an acoustic wave passing therethrough, and (4) a sprung structure of relatively low impedance yieldably supported by said unsprung structure and carrying a coil winding for movement in either of two opposite directions wthin said air gap, said sprung structure including (5) a thin rigid dome member yieldably supported in alinement with said aperture and secured at the periphery thereof to said coil winding, said dome member having both surfaces thereof directly exposed to acoustic waves for moving said coil winding as the member is moved by the oil in each of said directions at the particle velocity thereof.

16. In a seismic system for making surveys of subaqueous structures, in combination (1) an acoustic particle velocity detector disposed within an elongated neutrally buoyant oil filled flexible streamer adapted to be towed beneath the surface of the water for making seismic surveys of subaqueous structures comprising (2) an annular permanent magnet, (3) an upper pole piece of annular configuration secured to one end of said magnet in coaxial relation therewith, (4) a lower pole piece of generally annular configuration secured to the other end of said magnet and configured to provide a cylindrical magnetic air gap at the inner surface of the upper pole piece, the circular space within said lower pole piece being sufficiently large to prevent substantial impedance to an acoustic wave passing therethrough, (5) a thin rigid dome member of a size substantially equal to the diameter of said air gap and having both surfaces thereof directly exposed to acoustic waves, (6) flexible means on said upper pole piece for yieldably supporting the dome member coaxially with said air gap and slightly spaced therefrom, and (7) a cylindrical coil winding carried by said dome member at the peripheral portion thereof and movable in either of two opposite directions within the air gap by said dome member as the dome member is moved in each of said directions by said oil at the particle velocity thereof.

References Cited by the Examiner

UNITED STATES PATENTS

| | | | |
|---|---|---|---|
| 2,449,085 | 9/1948 | Peterson | 340—7 |
| 2,465,696 | 3/1949 | Paslay | 181—0.5 |
| 2,590,530 | 3/1952 | Groenendyke | 340—7 |
| 2,740,945 | 4/1956 | Howes | 340—15.5 |

BENJAMIN A. BORCHELT, *Primary Examiner.*

P. A. SHANLEY, *Assistant Examiner.*